United States Patent
Haramoto et al.

[11] Patent Number: 6,106,596
[45] Date of Patent: Aug. 22, 2000

[54] RECEIVER/DRYER AND METHOD OF ASSEMBLY

[75] Inventors: Cary Haramoto, Newark, N.Y.; Michael L. Ford, Baldwyn; Tom C. Wilson, Booneville, both of Miss.

[73] Assignee: Parker-Hannifin Corporation, Cleveland, Ohio

[21] Appl. No.: 09/150,187

[22] Filed: Sep. 10, 1998

Related U.S. Application Data

[62] Division of application No. 08/892,379, Jul. 14, 1997, Pat. No. 5,910,165.
[60] Provisional application No. 60/022,832, Jul. 31, 1996.

[51] Int. Cl.$^7$ ................................................. B01D 53/04
[52] U.S. Cl. ........................ 96/135; 96/137; 96/139; 96/152; 96/153; 55/518; 55/DIG. 5; 62/474; 210/282
[58] Field of Search ............................ 62/474; 210/262, 210/282, DIG. 6; 95/117; 96/108, 147, 151, 134–139, 152, 153; 55/516, 518, 519

[56] References Cited

U.S. PATENT DOCUMENTS

| | | | |
|---|---|---|---|
| 1,439,151 | 12/1922 | Dailey et al. ........................... | 96/135 |
| 1,726,805 | 9/1929 | Carrey . | |
| 1,743,877 | 1/1930 | Broido . | |
| 1,809,834 | 6/1931 | Davenport . | |
| 1,839,350 | 1/1932 | Slagel . | |
| 2,043,298 | 6/1936 | Markels ........................... | 55/519 X |
| 2,225,990 | 12/1940 | Henry . | |
| 2,504,184 | 4/1950 | Dawson . | |
| 2,705,405 | 4/1955 | Uhlman . | |
| 2,758,719 | 8/1956 | Line . | |
| 2,835,114 | 5/1958 | Shoemaker et al. . | |
| 2,958,105 | 11/1960 | Morton ........................... | 55/518 X |
| 3,029,581 | 4/1962 | Robbins ........................... | 96/136 |
| 3,146,602 | 9/1964 | Swearingen . | |
| 3,545,227 | 12/1970 | Grahl . | |
| 3,785,164 | 1/1974 | Wrenn, Jr. . | |
| 4,118,323 | 10/1978 | Sugiyama et al. . | |
| 4,288,894 | 9/1981 | Jacobellis . | |
| 4,291,548 | 9/1981 | Livesay . | |
| 4,331,001 | 5/1982 | Jones . | |

(List continued on next page.)

FOREIGN PATENT DOCUMENTS

| | | |
|---|---|---|
| 0732555 | 9/1996 | European Pat. Off. . |
| 1139518 | 11/1962 | Germany . |
| 3543206 | 6/1987 | Germany . |
| 53-38052 | 4/1978 | Japan . |

*Primary Examiner*—Robert Spitzer
*Attorney, Agent, or Firm*—Christopher H. Hunter

[57] ABSTRACT

A receiver/dryer includes a canister with a cylindrical sidewall, an integral lower end, and an open upper end. A pick-up tube is disposed centrally within the canister. The lower end of the pick-up tube has a wedged-shape and is supported by the lower end of the canister. The upper end of the pick-up tube has an annular groove that carries an O-ring seal. A lower baffle and lower filter pad are received over the pick-up tube with the lower baffle having a tight slip-fit therewith. Loose desiccant is supported by the lower baffle and filter pad. An upper filter pad and upper baffle are received over the pick-up tube, with the upper baffle having a slip-fit therewith. An upper end cap is secured to the open end of the canister, with the pick-up tube being received within an outlet passage in the upper end cap, and the O-ring seal providing a fluid-tight seal between the pick-up tube and the end cap. According to another aspect, a desiccant tube is disposed in fluid-tight relation around the pick-up tube and extends between the lower baffle and the upper baffle. The lower baffle has a fluid-tight fit with the desiccant tube, and preferably has an annular bead and annular flange on the desiccant tube retaining the baffle to the tube. The pick-up tube can be connected off-center to the end cap, and then bent or curved so as to be aligned with the desiccant tube.

23 Claims, 5 Drawing Sheets

U.S. PATENT DOCUMENTS

| | | | |
|---|---|---|---|
| 4,364,756 | 12/1982 | Clarke et al. | 96/137 |
| 4,436,623 | 3/1984 | Cullen et al. . | |
| 4,496,378 | 1/1985 | Kish . | |
| 4,649,719 | 3/1987 | Yanagisawa . | |
| 4,707,999 | 11/1987 | Ohta et al. . | |
| 4,745,772 | 5/1988 | Ferris . | |
| 4,756,166 | 7/1988 | Tomasov . | |
| 4,788,833 | 12/1988 | Steele . | |
| 4,838,901 | 6/1989 | Schmidt et al. | 96/139 X |
| 4,908,132 | 3/1990 | Koval et al. | 96/137 X |
| 4,920,766 | 5/1990 | Yamamoto et al. . | |
| 5,038,582 | 8/1991 | Takamatsu . | |
| 5,048,309 | 9/1991 | Carlisle, Jr. . | |
| 5,110,330 | 5/1992 | Loughran | 96/134 X |
| 5,179,780 | 1/1993 | Wintersteen et al. . | |
| 5,191,775 | 3/1993 | Shiina et al. . | |
| 5,201,195 | 4/1993 | Gavlak et al. . | |
| 5,215,660 | 6/1993 | Mosher et al. . | |
| 5,245,842 | 9/1993 | Searfoss et al. . | |
| 5,247,813 | 9/1993 | Bottum . | |
| 5,289,697 | 3/1994 | Hutchison . | |
| 5,304,235 | 4/1994 | Watanabe et al. | 96/134 X |
| 5,365,751 | 11/1994 | Mikesell et al. . | |
| 5,375,327 | 12/1994 | Searfoss et al. . | |
| 5,398,523 | 3/1995 | Yoshii et al. . | |
| 5,403,387 | 4/1995 | Flynn et al. . | |
| 5,415,014 | 5/1995 | Waldschmidt et al. . | |
| 5,419,141 | 5/1995 | Burk . | |
| 5,425,250 | 6/1995 | Hutchison et al. . | |
| 5,435,153 | 7/1995 | Hutchison et al. . | |
| 5,569,316 | 10/1996 | Flaugher et al. | 96/135 |
| 5,580,451 | 12/1996 | Tack | 96/108 X |
| 5,596,882 | 1/1997 | Hutchinson et al. . | |
| 5,689,893 | 11/1997 | Mitsch | 96/137 X |
| 5,716,432 | 2/1998 | Perrine | 96/135 |
| 5,718,743 | 2/1998 | Donnelly et al. | 96/135 |
| 5,910,165 | 6/1999 | Haramoto et al. | 62/474 |

RECEIVER/DRYER AND METHOD OF ASSEMBLY

RELATED CASES

This is a divisional application of Ser. No. 08/892,379, filed Jul. 14, 1997, now U.S. Pat. No. 5,910,165, the disclosure of which is incorporated herein by reference, which application is based on Provisional Application No. 60/022,832, filed Jul. 31, 1996.

FIELD OF THE INVENTION

The present invention relates generally to receiver/dryers for refrigeration and air conditioning systems, and methods for assembling such receiver/dryers.

BACKGROUND OF THE INVENTION

A receiver/dryer is a common component of a refrigeration or air conditioning system, and receives excess refrigerant in the cooling cycle, separates vapor refrigerant from liquid refrigerant, and removes water and particulate matter.

One type of receiver/dryer includes a cylindrical canister with inlet and outlet fittings at one end which allow refrigerant to flow into and out of the canister. One of the fittings (typically the outlet fitting) is connected at its internal end to a pick-up tube, which extends downwardly through the canister to the lower end. Layers of filters and desiccant material surround the pick-up tube along its length. Refrigerant is directed into the inlet fitting and flows through the filter pads and desiccant material to the bottom of the canister. The filter pads and desiccant material remove particles and other impurities from the refrigerant. The refrigerant then flows upwardly through the pick-up tube to the outlet fitting.

One type of desiccant material for such a receiver/dryer is provided in a fabric bag which retains the desiccant and allows the desiccant to be easily located within the canister during assembly. Designs for such desiccant bags include a pouch, saddle-bag or donut-shape, and are shown for example in Searfoss, et al., U.S. Pat. No. 5,245,842; Kish, et al., U.S. Pat. No. 4,496,378; Wintersteen, et al., U.S. Pat. No. 5,179,780; Shiina, et al., U.S. Pat. No. 5,191,775; and Mosher, et al., U.S. Pat. No. 5,215,660.

A desiccant bag particularly lends itself to easy assembly within a receiver/dryer which has the lower end wall of the canister formed in one piece (or at least integrally) with the side walls of the canister. The lower end wall can be formed by drawing, impacting or spin-forming the sidewalls of the canister closed at one end. While all subsequent components must be inserted from the open upper end of the canister, such canisters have been found to be cost-effective to produce for certain applications.

In a receiver/dryer with an integral lower end wall, the desiccant bag, and any filters, baffles, etc., are introduced into the canister from the upper end. The pick-up tube is then pre-assembled with the upper end cap and inserted into the canister. The desiccant bag could also be initially located around the pick-up tube and introduced into the canister at the same time as the pick-up tube. The upper end cap is then fluidly sealed to the sidewalls of the canister by appropriate means, e.g., welding, brazing, soldering, etc., and the receiver/dryer is connected within the refrigeration system. By using such a desiccant bag, it is relatively easy to introduce the pick-up tube down through the canister as the desiccant remains contained within the bag and does not randomly disperse throughout the canister.

While the above receiver/dryers have received some acceptance in the marketplace, enclosing the desiccant in a bag adds labor and material cost to the receiver/dryer, and does not allow flexibility in using the bags in a wide variety of applications. For example, each bag is designed for a specific application and has a predetermined volume, porosity, material and desiccant composition, etc. To change the structure, material or composition of the desiccant bag for other applications, new bags typically must be manufactured. This can require tooling changes and ordering of new fabric and desiccant material, all of which can be time-consuming and expensive. Stocks of different sizes and types of desiccant bags also typically have to be kept on hand which can increase storage and inventory costs, and hence the over-all cost of the receiver/dryer.

As such, applicants believe that it would be desirable to use loose desiccant material for the receiver/dryer in certain applications. Such loose desiccant material can be less expensive to purchase and is easily adaptable to a wide variety of applications (i.e., does not have restrictions as to form or composition). The desiccant can just be added (poured) into the canister in the desired amount, with no additional labor or material costs.

In using loose desiccant material, however, it can be difficult to assemble the receiver/dryer when the canister is formed with an integral lower end. To begin with, the pick-up tube is typically pre-assembled with the upper end cap and secured thereto by, e.g., coining, crimping, or swaging, so as to ensure a fluid-tight connection. In so doing, the desiccant must be introduced into the canister before the pick-up tube is inserted, or else the end cap blocks the easy filling of the canister, as well as the introduction of subsequent components such as the upper baffle and filter pad. However, it can be difficult (or even impossible) to introduce the pick-up tube into the canister when the loose desiccant is randomly dispersed in the canister. Specifically, it is not desirable to force the pick-up tube through a loose bed of desiccant material. The desiccant can also flow through the pick-up tube opening in the lower baffle before the pick-up tube is inserted into the canister, and thus enter the lower, quiescent area of the receiver/dryer.

In addition, applicants believe that the pick-up tube has heretofore been formed essentially straight and vertical to allow the pick-up tube to be inserted through the various baffles and filter pads in the canister. In so doing, the upper end of the pick-up tube is necessarily connected to the upper end cap along the center-line of the canister. However, in some applications it can be desirable to mount a plurality of components to the top surface of the end cap. If the pick-up tube must be connected along the center-line, this can limit the ability to attach additional exterior components to the end cap, and hence limit the usefulness of the receiver/dryer for some applications. While it is known to form the outlet passage off-center on the end cap, cross holes must then be drilled transversely through the end cap to connect the outlet passage to the pick-up tube, which increases machining steps, labor costs, and wasted material.

As such, applicants believe there is a demand in the marketplace for a receiver/dryer which, although it includes an integral lower end, is simple to assemble and is particularly suited to accepting loose desiccant material to reduce the over-all cost of the receiver/dryer. Applicants also believe there is a demand for a receiver/dryer which allows for an off-center connection between the pick-up tube and the end cap such that there is flexibility in attaching exterior components to the end cap.

SUMMARY OF THE PRESENT INVENTION

The present invention provides a new and unique receiver/dryer, and method of assembly for such a dryer, which allows loose desiccant to be filled from the top of the receiver/dryer. According to one aspect, a bent or curved pick-up tube can be used such that an off-center connection to the upper end cap can be obtained. The receiver/dryer is simple to assemble, cost-effective to produce, and has flexibility in attaching exterior components to the upper end cap of the receiver/dryer.

According to the present invention, the receiver/dryer preferably has an end cap or wall formed in one piece with the sidewall of the canister. The canister can be drawn, impacted, spun, or otherwise formed with the closed lower end. A pick-up tube is then inserted through the open upper end of the canister. According to one aspect of the present invention, the bottom end of the pick-up tube has a notched or wedged-shape design and rests against the lower, closed end of the canister. The notch allows refrigerant to flow into (or out of) the pick-up tube. The upper end of the pick-up tube has an outer annular groove or channel which receives an O-ring seal.

A lower baffle and filter pad, both of which have a central opening, are then located over the pick-up tube and are disposed toward the lower, closed end of the canister. The baffle preferably has a slip-fit with the pick-up tube, and a slip-fit with the interior sidewall of the canister, and can be staked to the pick-up tube and/or the canister, if necessary or desirable. Preferably, the periphery of the baffle is supported by a tapered shoulder in the canister, which is formed between the sidewall and the lower, closed end of the canister and creates essentially a fluid-tight fit. Loose desiccant is then poured into the canister in the desired amount, and is supported by the lower baffle and filter pad.

An upper filter pad and baffle, both of which also have a central opening, are then received over the pick-up tube, and support the upper end of the desiccant material. The upper baffle also preferably has a slip-fit with the pick-up tube and the canister, and can be staked to the pick-up tube and/or the canister. The upper and lower baffles (and filter pads), prevent vibration or movement of the desiccant material.

An upper end cap, with inlet and outlet passages, is then located over the upper, open end of the canister. The upper end of the pick-up tube is received within the outlet passage of the end cap, and preferably has a slip-fit therewith. The support of the pick-up tube on the lower end of the canister forces the upper end of the tube into the outlet passage. The O-ring on the upper end of the pick-up tube provides a fluid-tight seal within the upper end cap. The upper end cap is then secured to the canister with a fluid-tight seal, such as by brazing, welding, soldering, etc.

According to a further aspect of the present invention, a desiccant tube is provided around the pick-up tube and has a press-fit, fluid-tight seal therewith. The desiccant tube extends at least between the lower baffle and the upper baffle, and is surrounded by the desiccant material. The lower and upper baffles have a slip-fit with the desiccant tube, and can be staked thereto. The lower baffle is preferably retained between an annular bead and an outwardly-projecting flange on the lower end of the desiccant tube. The bead and flange on the desiccant tube can be controlled during forming such that one (or both) creates a press-fit with the pick-up tube when the pick-up tube is later inserted into the desiccant tube. Alternatively, the lower baffle could be formed in one-piece with the desiccant tube, and the tube could be roll-formed to create the press-fit with the pick-up tube.

In this aspect, the desiccant tube with lower baffle and filter pad can be inserted first into the receiver/dryer canister, and the loose desiccant can then be poured into the canister with the lower baffle and filter pad supporting the lower end of the desiccant material. The upper filter pad and upper baffle can then be located over the desiccant tube to support the upper end of the desiccant material. The pick-up tube is then pre-assembled with the upper end cap and inserted through the desiccant tube. The pick-up tube can be connected to the upper end cap such as by crimping or coining the pick-up tube to the end cap. In this case, the pick-up tube can be spaced from the lower, closed end of the canister. Alternatively, the pick-up tube can be connected as in the first aspect of the invention, i.e., a slip-fit within the outlet passage of the end cap with an O-ring providing a fluid-tight seal.

In this further aspect of the invention, the pick-up tube can be bent or curved, such that the lower end of the pick-up tube is aligned with the desiccant tube, but that the upper end is connected in an off-center relation to the outlet passage in the end cap. This allows flexibility in connecting exterior components to the end cap.

In either aspect described above, the present invention provides a simple and cost-effective receiver/dryer and method for assembling such a receiver/dryer. Loose desiccant material, rather than desiccant bags, can be used with the receiver/dryer, which reduces the over-all cost of the receiver/dryer and provides flexibility in tailoring the amount, composition, etc. of desiccant material to the particular application. In addition, an off-center connection to the end cap is provided, which increases the flexibility of attaching exterior components to the end cap of the receiver/dryer.

Further features of the present invention will become apparent to those skilled in the art upon reviewing the following specification and attached drawings.

DETAILED DESCRIPTION OF THE PREFERRED EMBODIMENT

Figure 1:
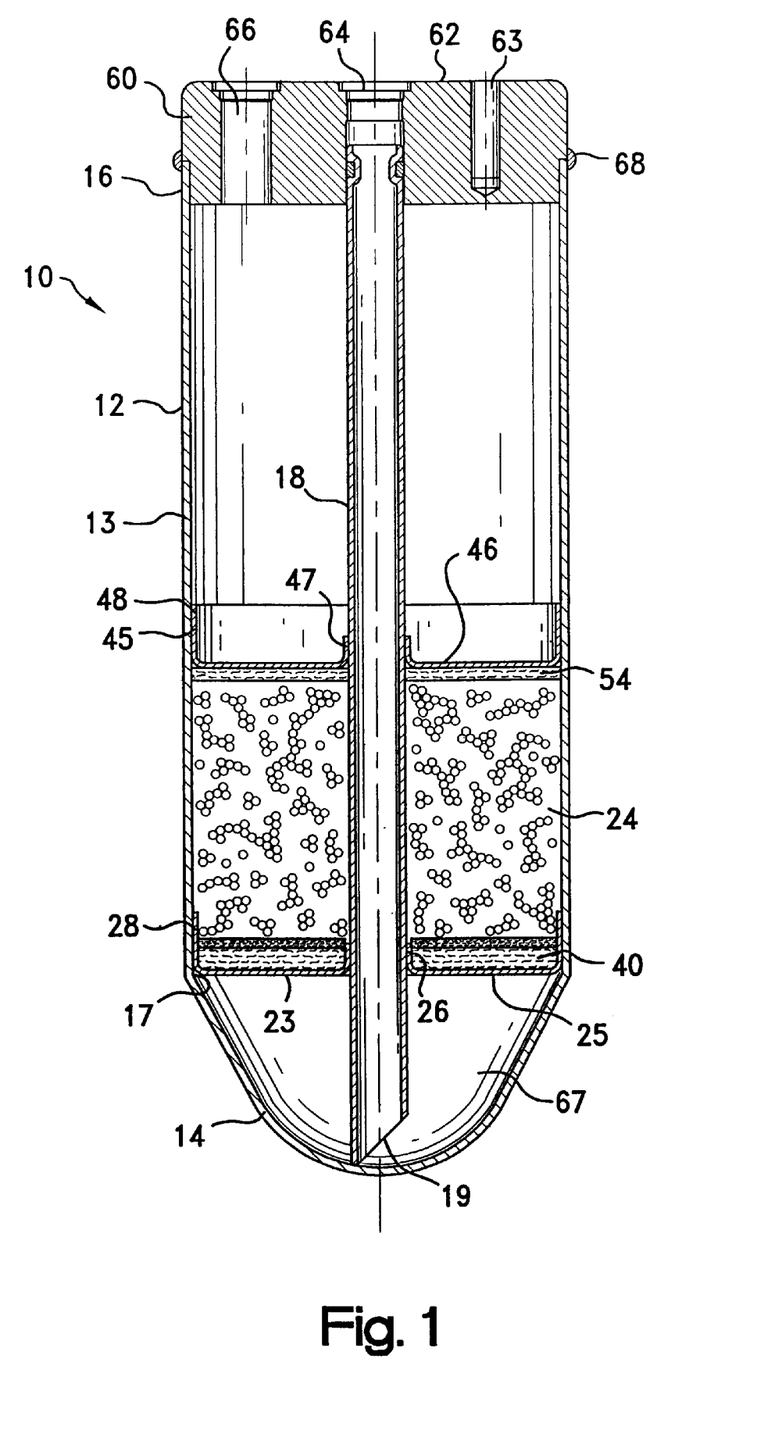
FIG. 1 is a cross-sectional side view of a receiver/dryer constructed according to the principles of the present invention.
Figure 2:
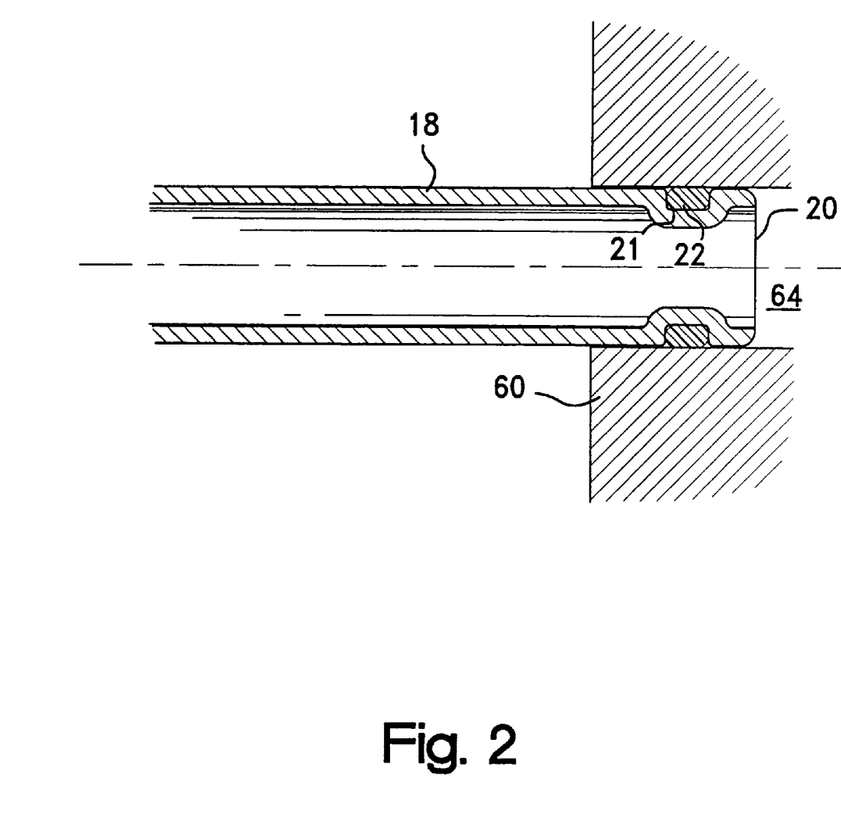
FIG. 2 is an enlarged, cross-sectional view of the upper end of the pick-up tube and the upper end cap.

Referring to the drawings, and initially to FIGS. 1 and 2, a receiver/dryer constructed according to the principles of the present invention is indicated generally at 10. The receiver/dryer includes a cylindrical canister 12 having a sidewall 13 with a lower closed end 14 and an upper open end 16. Canister 12 is preferably formed from appropriate material, such as aluminum (type 6061), and the closed lower end 14 is preferably formed in one piece with the sidewall such as by drawing, impacting or spin-forming the lower end of the sidewall. The lower end 14 could also be welded, brazed, soldered or attached in some other manner to the sidewall 13 such that the lower end wall is at least integral (i.e., non-removable) with the sidewall. The canister could also be formed from other materials, such as steel. However the present invention is particularly suited to aluminum canisters formed in one-piece with a lower end cap or wall. The techniques for forming aluminum (or other metals) by the above methods are known to those skilled in the art. In any case, the closing operation preferably forms an annular tapered shoulder 17 between sidewall 13 and lower end 14, which will be explained herein in more detail.

The receiver/dryer 10 includes a pick-up tube 18 which is disposed within canister 12 and extends along the central, longitudinal axis thereof. Pick-up tube 18 is also preferably formed from aluminum (type 3003) and has a lower downstream end 19 with a wedge or notch-shaped configuration. The lower end 19 of pick-up tube 18, and particularly the "point" of the wedge or notch, is disposed against the lower end 14 of the canister. The wedge or notched-shaped design allows fluid to enter (or exit) the hollow central bore of the pick-up tube. The upper end 20 of the pick-up tube has an annular channel or groove 21 formed by, e.g., roll-forming, surrounding the tube proximate end 20. Groove 21 has a depth which is sufficient to receive an elastomeric O-ring seal 22, with seal 22 projecting slightly outward from the groove in its natural or relaxed state.

Figure 3:
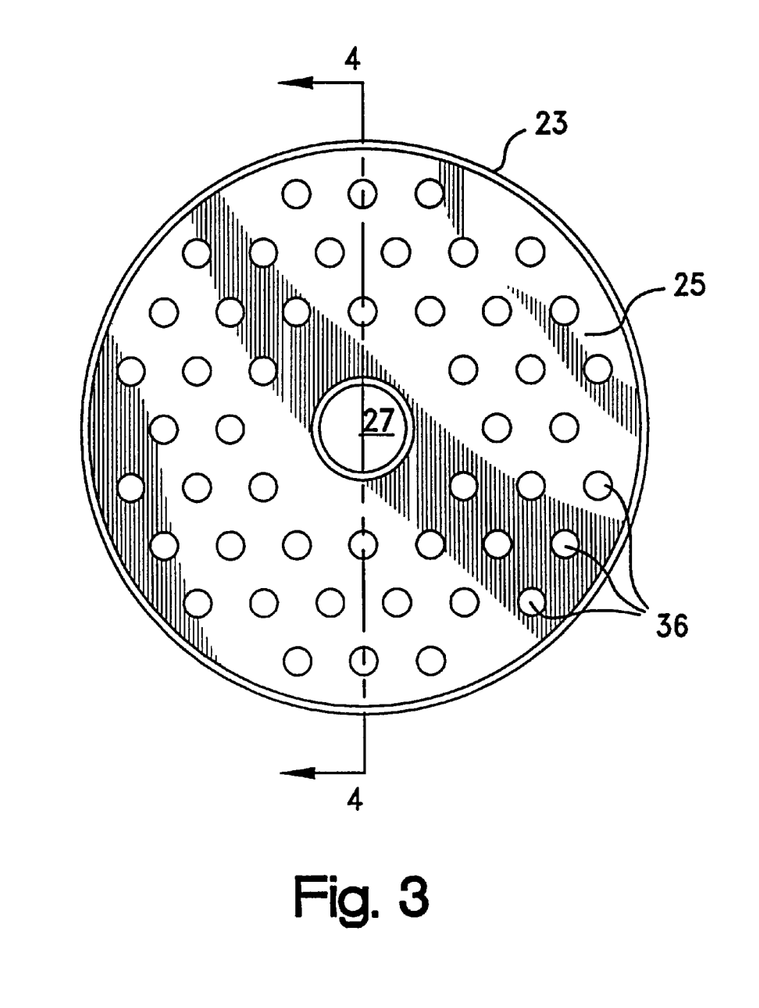
FIG. 3 is a plan view of a baffle for the receiver/dryer of FIG. 1.
Figure 4:
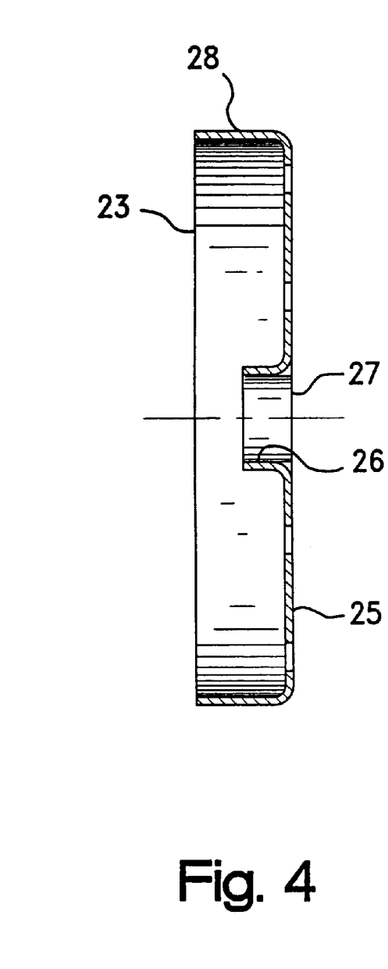
FIG. 4 is a cross-sectional view of the baffle of FIG. 3.

As shown in FIGS. 1, 3 and 4, the receiver/dryer also includes a lower or downstream annular baffle 23 which supports desiccant material 24. Lower baffle 23 has a flat annular body 25 with an inner annular collar or flange 26 forming a central opening 27, and an outer annular collar or flange 28 extending around the periphery. Both the inner flange 26 and outer flange 28 extend downstream from body 25. Outer flange 28 preferably closely matches the inner diameter of canister sidewall 13, such that the outer flange is secured with at least a slip-fit (press-fit if possible) to the sidewall. The inner flange 26 also closely matches the outer diameter of the pick-up tube 18, such that the inner flange is also secured with a slip-fit (press-fit if possible) to pick-up tube 18. Alternatively, lower baffle 23 could be pre-assembled with pick-up tube 18 and could be more firmly attached, such as by coining or crimping the inner flange 26 to the pick-up tube, or by providing one or more closely-spaced annular beads on the pick-up tube to retain the baffle at a specific location. The baffle could also be formed without inner and/or outer flanges 26, 28, and have merely the inner diameter and outer diameter of body 25 retain the body between the pick-up tube and canister. In any case, the baffle could be staked to the pick-up tube and/or the canister, if necessary or desirable, to retain the baffle more securely between these components. Finally, a plurality of perforations or openings, for example as indicated at 36, are formed in the flat body 25 of baffle 23 to allow fluid flow therethrough. Baffle 23 is formed from an appropriate material, for example aluminum, using conventional metal-forming techniques such as dies and stamps, or should be known to those skilled in the art.

Figure 5:
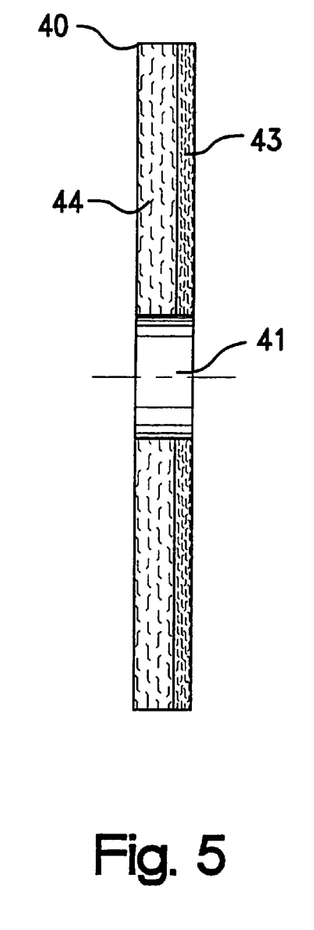
FIG. 5 is a cross-sectional side view of a filter pad for the receiver/dryer of FIG. 1.

Against the upstream surface of baffle 23, and extending between inner flange 26 and outer flange 28, is a lower annular filter pad 40. Filter pad 40 includes a central opening 41 which corresponds to the central opening 27 of baffle 23. Filter pad 40 prevents migration of desiccant material 24 through lower baffle 23, and provides filtration of refrigerant flowing therethrough. As shown more particularly in FIG. 5, the lower filter pad preferably has an upstream, more porous (less dense) layer 44 in contact with the downstream surface of baffle 23, and a downstream, less porous (more dense) layer 43 facing away from baffle 23. Filter pad 40 is formed of an appropriate porous material, for example fiberglass, although lower baffle 23 could also be formed from such a material to filter the refrigerant, in which case the lower filter pad might not be necessary.

Desiccant material 24 is preferably a conventional desiccant which is available from a number of sources. For example, an appropriate desiccant material is manufactured by UOP under the trademarks/designations XH7 and XH9. Other types of desiccant material can of course be used, and it is noted that the present invention is primarily directed toward a "loose-fill" desiccant, that is, a desiccant which is not contained within any bag, but is rather in a loose state and constrained only by the sidewall of the canister and the upper and lower baffles (and filter pads). Such loose-fill desiccant tends to be less expensive than desiccant material which is available in a bag form, although it should be apparent that desiccant in a bag form could of course be used with the present invention, although more expensive. The amount of desiccant necessary for the receiver/dryer depends on the particular application and can be easily determined by those skilled in the art. The present invention has the flexibility to use different volumes or compositions of desiccant material in a simple and easy manner by merely filling the canister to the desired level. The receiver/dryer is not limited to a particular volume or composition of desiccant, and can be used in different applications without having to order or stock desiccant bags of different volumes, sizes or composition.

The upper annular baffle 45 is similar to the lower baffle 23, and includes a perforated flat body 46 preferably bounded on its inside by an inner annular flange or collar 47 and on its periphery by an outer annular flange or collar 48. The inner and outer flanges 47, 48 again extend downstream from body 46. Baffle 45 could also be formed without inner flange 47 and outer flange 48, as with the lower baffle 23. An upper annular filter pad 54 has a central opening and is provided against the upstream surface of baffle 45 to prevent migration of desiccant material through the baffle, and for filtration of refrigerant flowing therethrough. Upper baffle 45 and filter pad 54 preferably have the same configuration and are formed of the same material as lower baffle 23 and filter pad 40 illustrated in FIGS. 3–5 to support the upper end of the desiccant material. The outer annular collar 48 preferably is secured with at least a slip-fit to the inner diameter of canister 12, while the inner annular flange 47 is secured with at least a slip-fit to the pick-up tube 18. The inner and outer flanges of the upper baffle could also be staked to the pick-up tube and/or the canister, if necessary or desirable. The upper and lower baffle (and filter pads) securely hold the desiccant material to prevent undesirable movement or vibration thereof.

An upper annular end cap 60 encloses the open upper end 16 of canister 12. End cap 60 preferably has a substantially flat exterior surface 62 with mounting holes 63 for mounting exterior components. An outlet passage 64 and an inlet passage 66 extend through the end cap. In this aspect of the invention, the outlet passage 64 is preferably disposed about the longitudinal center-line of the canister and receives the upper end 20 of the pick-up tube when assembled. The outlet passage and inlet passage could also be reversed in particular applications, i.e., the inlet passage could be connected to the pick-up tube, and the present invention is not intended to be limited to either passage being for "inlet" or "outlet" refrigerant flow. However, in most applications, the outlet passage will be connected to the pick-up tube to direct refrigerant out of the lower end of the receiver/dryer. In any case, the pick-up tube 18 is received with a slip-fit within passage 64. The O-ring 22 at the end of the tube provides a fluid-tight seal between the pick-up tube and the end cap when the end cap is assembled to the canister, without the need for any mechanical sealing (such as by coining, crimping, etc.) to the end cap. The end cap is then fluidly sealed to the sidewall 13 of the canister such as by welding, brazing, soldering, etc., such as at 68.

In assembling the receiver/dryer, canister 12 is initially provided with lower end cap 14 formed integrally therewith, and preferably in one piece therewith. Pick-up tube 18 is inserted within canister 12, with the lower end 19 of the pick-up tube contacting the closed, lower end 14 of the canister. Next, the lower baffle 23 and lower filter pad 40 are received about the pick-up tube and slid down toward the lower end 19. The lower baffle 23 is attached to the pick-up tube by the slip-fit therewith, or alternatively, as described above, could be pre-assembled with the pick-up tube and attached thereto such as by coining or crimping, or by one or more annular beads. The lower baffle 23 is preferably supported at its periphery by the inwardly-tapered shoulder 17 formed at the intersection of sidewall 13 and lower end 14. The contact between the periphery of the lower baffle and the shoulder creates essentially a fluid-tight seal with the canister. The lower surface of baffle 23 faces the lower end of the receiver dryer and, together with the lower end, defines a quiescent chamber 67.

Next, the loose desiccant material 24 is loaded (e.g., poured) through the open end of canister 12 to fill an appropriate portion of the canister. The lower baffle 23 supports the lower end of the desiccant material while lower filter pad 40 prevents the desiccant from passing through the openings in the lower baffle.

Next, the upper filter pad 54 and upper baffle 45 are received about the pick-up tube 18 and slid down to support the upper end of the desiccant material. The upper filter pad 54 prevents desiccant from passing through the openings in the upper baffle, while both the upper and lower baffles (and filter pads) prevent undesirable movement or vibration of the desiccant material.

Upper end cap 60 is then located over the open upper end 16 of the canister, with the upper end 20 of the pick-up tube 18 being received within outlet passage 64. By supporting the lower end 19 of the pick-up tube 18 against the lower end 14 of the canister, the pick-up tube is forced into passage 64, with the O-ring 22 providing a fluid-tight seal therebetween. The fluid-tight seal created by O-ring 22 can be provided anywhere along the length of the passage 64, which allows the tolerances between these components to be greater. The upper end cap is then fluidly-sealed to the canister in an appropriate manner, such as by brazing, welding, soldering, etc. as at 68. The outlet and inlet to passages 64, 66 are then fluidly connected within the refrigeration system in a conventional manner, and refrigerant is introduced (typically from the condenser) through the inlet passage and down through the baffles, filter pads and desiccant material to the quiescent chamber to remove water and particulate matter. Refrigerant is then drawn upward through pick-up tube and directed through the outlet passage to the refrigeration system (typically to the expansion device).

Figure 6:
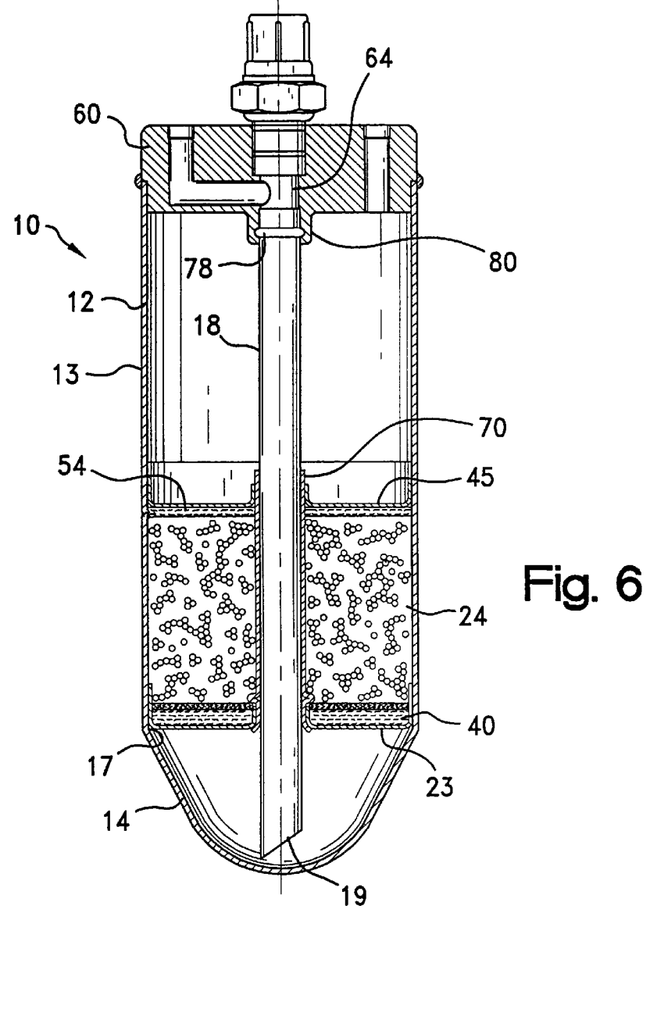
FIG. 6 is a cross-sectional side view of a receiver/dryer constructed according to a further aspect of the present invention.
Figure 7:
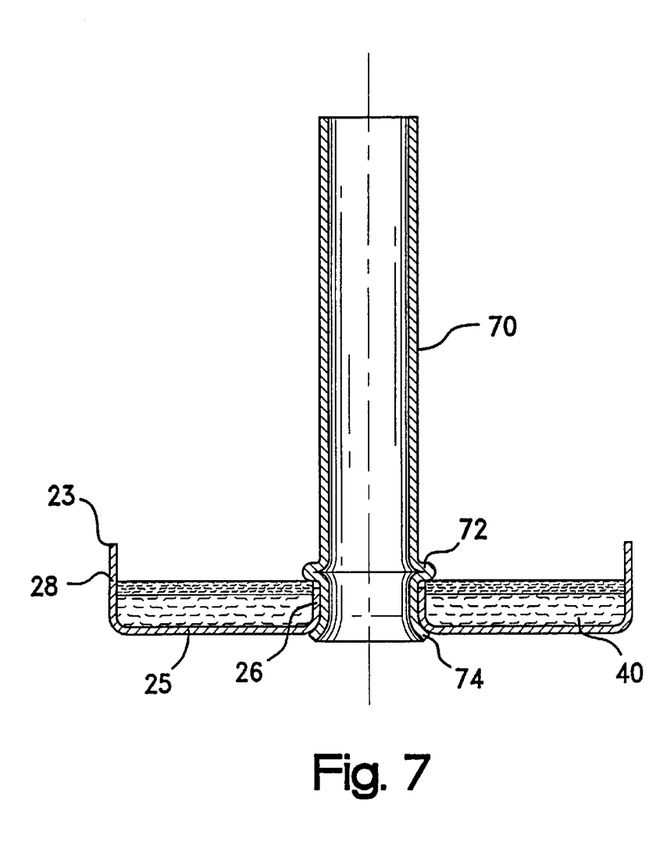
FIG. 7 is an enlarged cross-sectional side view of the receiver/dryer of FIG. 6, but showing certain components of the receiver/dryer in an initial stage of assembly.

According to a second aspect of the present invention, as illustrated in FIGS. 6 and 7, the receiver/dryer 10 can include a desiccant tube 70 co-axial with and received around the pick-up tube 18, with the desiccant tube 70 extending between lower baffle 23 and upper baffle 45. Lower baffle 23 has at least a slip-fit (press-fit if possible) with desiccant tube 70. It is preferred that desiccant tube 70 have an annular bead 72 and an outwardly-turned annular flange 74 at the lower end of the desiccant tube. Bead 72 and flange 74 are spaced close together and contact opposite sides of lower baffle 23. Specifically, bead 72 contacts the upper, radially-extending end surface of flange 26 on baffle 23, while flange 74 on desiccant tube 70 follows the curve of flange 26 and supports body 25 along the inner diameter on the lower, upstream surface of the baffle, thus securing the baffle to the desiccant tube.

The inner diameter of the desiccant tube can be easily and closely controlled when the bead and/or flange are formed on the desiccant tube. End forming or flange roll forming machines can create the bead or flange and at the same time narrow the inner diameter of the tube at the location of the bead or flange. When the pick-up tube is inserted, a press-fit, fluid-tight seal is provided between the desiccant tube and the pick-up tube at the location of the bead or flange.

Alternatively, the inner flange 26 on the lower baffle could be roll-formed into engagement with the desiccant tube 70, or a closely-spaced pair of beads could be formed in the desiccant tube, rather than a bead and flange. Desiccant tube 70 and lower baffle 23 could also be formed together as one piece. In this case, the desiccant tube could just be roll-formed, with the inner diameter closely controlled so as to provide a press-fit with the pick-up tube when the pick-up tube is later inserted into the desiccant tube. In any case, end-forming, flange roll forming and roll forming machines which create such beads and flanges are conventional machinery and should be known to those skilled in the art. It should also be noted that the remainder of the desiccant tube can be merely a slip-fit with the pick-up tube, which relieves tolerances and reduces fabrication costs of the desiccant tube and pick-up tube.

According to this further aspect of the invention, lower baffle 23 and desiccant tube 70 are preferably inserted first into canister 12. Lower baffle 23 is preferably supported at its periphery by the shoulder 17 formed between canister sidewall 13 and the lower end 14. Lower filter pad 40 is then assembled with lower baffle 23. Desiccant 24 is then introduced into the canister and supported at its lower end by baffle 23 (and lower filter pad 40). The upper filter pad 54 and upper baffle 45 are then introduced into the canister and received over desiccant tube 70 to support the other end of the desiccant material 24. The upper baffle 45 has a slip-fit with desiccant tube 70 and can also be staked to the desiccant tube, if necessary or desirable. With the tight-fit between lower baffle 23 and desiccant tube 70 (or these components being formed in one piece), and a press-fit between desiccant tube 70 and pick-up tube 18, essentially a fluid-tight seal is provided entirely across the lower baffle and the pick-up tube without any additional sealing components such as gaskets, rings, etc. As in the first aspect, the outer periphery of lower baffle 23, has at least a slip-fit (press-fit if possible) with the canister 12, while upper baffle 45 has a slip-fit with canister 12.

Figure 8:
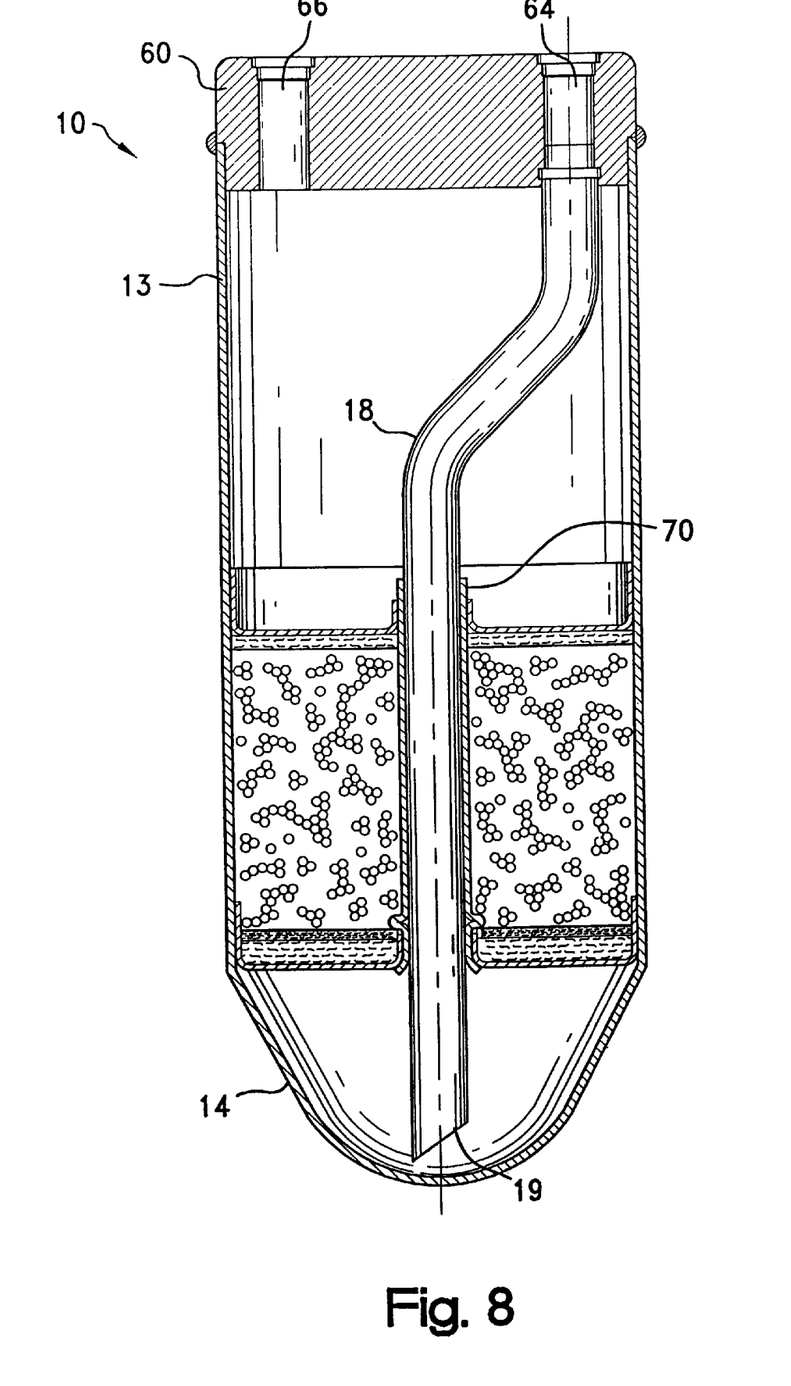
FIG. 8 is a cross-sectional side view of a receiver/dryer similar to FIG. 6, but showing a bent or curved pick-up tube.

Pick-up tube 18 can then be pre-assembled with end cap 60 and inserted through desiccant tube 70. Preferably, the pick-up tube has a bead 78 at its upper end which is received within a collar 80 surrounding passage 64. The collar is then coined or crimped around the bead to provide a fluid-tight connection between the pick-up tube and the upper end cap. An O-ring (not shown) can be provided within the collar (at the upper or lower side of bead 78) to improve the fluid-tight connection. In addition, as illustrated in FIG. 8, the pick-up tube 18 can be connected off-center to the end cap 60, and then bent or curved along the center line of the canister to be aligned with the desiccant tube 70. This provides flexibility in locating the outlet passage 64 in an off-center relation on the end cap and therefore in mounting additional components to the exterior surface of the end cap. The end cap 60 is then secured to canister sidewall 13 as described previously, such as by welding, brazing, soldering, etc.

It is noted that if pick-up tube 18 is secured to end cap 60 in the above manner (i.e., by crimping or coining), then the lower end 19 of the pick-up tube can be spaced from the lower end 14 of the canister. This is because the upper end of the pick-up tube is attached to the end cap, which does not occur in the first aspect of the present invention. Alternatively if the pick-up tube can be secured to the upper end cap as in the first aspect, i.e., by a slip-fit with an O-ring providing the fluid-tight seal. In this case, the pick-up tube can extend downward and be supported by the lower end 14 of the canister such that the upper end of the pick-up tube is pushed up through the outlet passage in the upper end cap when assembled.

Thus, as described above, the present invention provides a new and unique receiver/dryer and method for assembling such a receiver/dryer which is simple and cost-effective to manufacture. The receiver/dryer is particularly useful with loose desiccant which can be used even though the receiver/dryer has an integral lower end and must be loaded from the top. The receiver/dryer also has flexibility in being able to easily accommodate different volumes or compositions of desiccant material for different applications, and for allowing for the off-center connection of the pick-up tube to the end cap, without additional labor, material or costs.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. A receiver/dryer, comprising:
    a canister having a longitudinally-extending cylindrical sidewall, a first end cap integral with one end of said sidewall and an opening at another end of said sidewall;
    a pick-up tube extending longitudinally within said canister with a first end of said pick-up tube contacting said first end cap and a second end of said pick-up tube spaced remotely from said first end cap, said first end of said pick-up tube and said first end cap having cooperating structure allowing fluid flow into and out of said pick-up tube through said first end, said second end of said pick-up tube having an annular channel surrounding said pick-up tube, and a resilient annular sealing element received in said channel;
    a first annular baffle having a peripheral dimension closely matching an interior dimension of said sidewall and a central opening receiving said pick-up tube, said first baffle being disposed in said canister and received about said pick-up tube proximate said first end cap;
    a second annular baffle having a peripheral dimension closely matching the interior dimension of said sidewall and a central opening fluidly-sealed to said pick-up tube, said second baffle being disposed in said canister and received about said pick-up tube remotely from said first end cap;
    desiccant material disposed in said canister and surrounding said pick-up tube between said first and second baffles; and
    a second end cap having first and second passages extending through the second end cap to allow refrigerant to flow into and out of said canister, said second end cap enclosing said open end of said sidewall and receiving said second end of said pick-up tube in one of said passages, said sealing element at said second end of said tube providing a fluid-tight seal with said second end cap within said one of said passages.

2. The receiver/dryer as in claim 1, wherein said desiccant material is loose fill.

3. The receiver/dryer as in claim 2, wherein said desiccant material is supported directly against an interior surface of said canister sidewall.

4. The receiver/dryer as in claim 3, wherein said first end cap is formed in one piece with said sidewall.

5. The receiver/dryer as in claim 3, wherein said second end of said pick-up tube and said second end cap have a slip-fit, and said fluid-tight seal is provided without mechanical sealing means.

6. The receiver/dryer as in claim 3, wherein said first end of said pick-up tube has a wedge-shaped design, with a point of said wedge contacting said first end cap.

7. The receiver/dryer as in claim 3, wherein said first baffle and said canister sidewall have a tight seal therebetween.

8. The receiver/dryer as in claim 7, wherein said first baffle is secured to said sidewall.

9. The receiver/dryer as in claim 8, wherein said second baffle is secured to said pick-up tube and to said canister sidewall.

10. The receiver/ dryer as in claim 9, wherein said first baffle and said pick-up tube have at least a slip-fit therebetween.

11. The receiver/dryer as in claim 9, wherein said first baffle and said sidewall have at least a slip-fit therebetween.

12. The receiver/dryer as in claim 11, wherein said second baffle has at least a slip-fit with said sidewall and with said pick-up tube.

13. A method for assembling a receiver/ dryer, comprising the steps of:
    providing a canister having a longitudinally-extending cylindrical sidewall, a first end cap unitary with one end of said sidewall and an opening at another end of said sidewall;
    inserting a pick-up tube through the open end of the canister such that a first end of the pick-up tube contacts the first end cap of the canister;
    inserting a first baffle with a central opening over the pick-up tube, with the pick-up tube being received in said opening in said first baffle and having a fluid-tight seal therewith, a first surface of the first baffle facing the first end cap;
    locating loose desiccant in said canister, said loose desiccant being supported by a second surface of said first baffle;
    inserting a second baffle with a central opening over the pick-up tube, with the pick-up tube being received in said opening in the second baffle, and a first surface of the second baffle supporting the loose desiccant material; and attaching a second end cap to the open end of said canister, said second end cap having at least one fluid flow passage extending through the end cap, said pick-up tube being received within said at least one passage, with a fluid-tight seal being provided between said pick-up tube and said second end cap in said at least one passage.

14. The method as in claim 13, wherein a groove is formed proximate the second end of the pick-up tube and an annular seal is disposed in the groove, said annular seal providing a fluid-tight seal between the pick-up tube and the second end cap when the pick-up tube is received within the passage of the second end cap.

15. The method as in claim 14, wherein the pick-up tube is received with a slip-fit within said at least one passage.

16. The method as in claim 14, wherein said sidewall of said canister directly supports the loose desiccant between said first and second baffles.

17. A method for assembling a receiver/dryer, comprising the steps of:

providing a canister having a longitudinally-extending cylindrical sidewall, a first end cap unitary with one end of said sidewall and an opening at another end of said sidewall;

providing a first baffle in fluid-tight surrounding relation to a desiccant tube;

inserting the desiccant tube and the first baffle into the canister through the open end, with a first surface of said baffle facing said first end cap of said canister and a periphery of said first baffle being closely received in said canister;

subsequently locating loose desiccant in said canister, said loose desiccant being supported by a second surface of said first baffle; inserting a second baffle with a central opening over the desiccant tube, with the desiccant tube being received in said opening in the second baffle, and a first surface of the second baffle supporting the loose desiccant material and a periphery of said second baffle being closely received in said container;

inserting a pick-up tube into the desiccant tube, said desiccant tube and said pick-up tube having cooperating, mechanically-deformed structure which creates a fluid-tight seal between the desiccant tube and the pick-up tube; and subsequently attaching a second end cap to the opening of said canister, said second end cap having at least one fluid flow opening extending through the end cap, said pick-up tube being received within said opening, with a fluid-tight seal being provided between said pick-up tube and said second end cap.

18. The method as in claim 17, further including the step of pre-assembling the first baffle and desiccant tube, said desiccant tube having a pair of mechanically-deformed portions which together cooperate to retain said first baffle on said desiccant tube.

19. The method as in claim 18, further including the step of forming the desiccant tube so as to provide an inside diameter which is press-fit with an outside diameter of the pick-up tube.

20. The method as in claim 17, further including the step of forming the desiccant tube so as to provide an inside diameter which is press-fit with an outside diameter of the pick-up tube.

21. The method as in claim 20, wherein the desiccant tube is formed so as to have only a portion press-fit with the pick-up tube, the remainder of the desiccant tube being slip-fit with the pick-up tube.

22. The method as in claim 17, wherein said desiccant tube and first baffle are inserted into the canister before the pick-up tube is inserted into the desiccant tube.

23. A method for assembling a receiver/dryer, comprising the steps of:

providing a canister having a longitudinally-extending cylindrical sidewall, a first end cap unitary with one end of said sidewall and an opening at another end of said sidewall;

providing a first baffle in surrounding relation to a desiccant tube;

inserting the desiccant tube and first baffle into the canister through the open end, with a first surface of said baffle facing said first end cap of said canister and a periphery of said first baffle being closely received in said canister;

subsequently introducing loose desiccant into said canister through the open end, said loose desiccant being supported by a second surface of said first baffle and directly against an inside wall surface of the canister; inserting a second baffle with a central opening over the desiccant tube, with the desiccant tube being received in said opening in the second baffle, and a first surface of the second baffle supporting the loose desiccant material and a periphery of said second baffle being closely received in said container;

inserting a pick-up tube through the open end of the canister and into the desiccant tube, said desiccant tube and said pick-up tube having cooperating structure which creates a fluid-tight seal between the desiccant tube and the pick-up tube; and subsequently attaching a second end cap to the open end of said canister, said second end cap having a passage extending through the end cap, said pick-up tube being received within said passage, with a fluid-tight seal being provided between said pick-up tube and said second end cap.

* * * * *